UNITED STATES PATENT OFFICE.

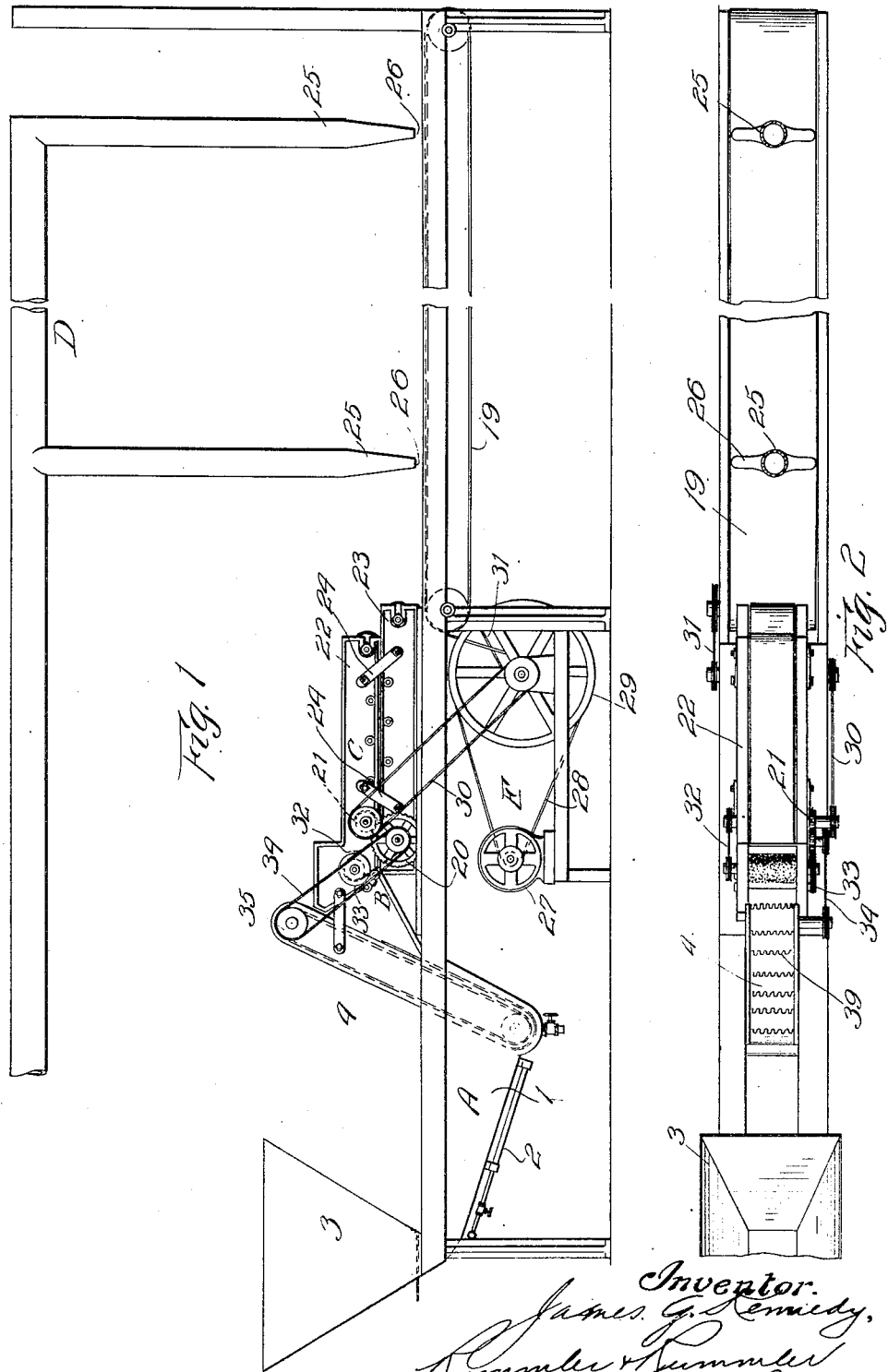

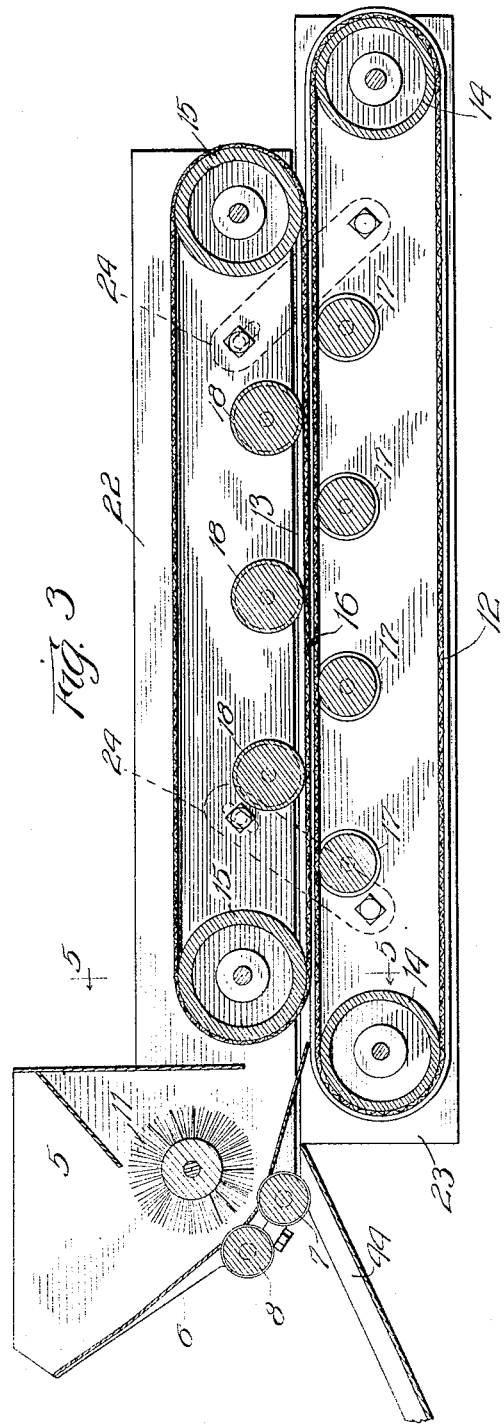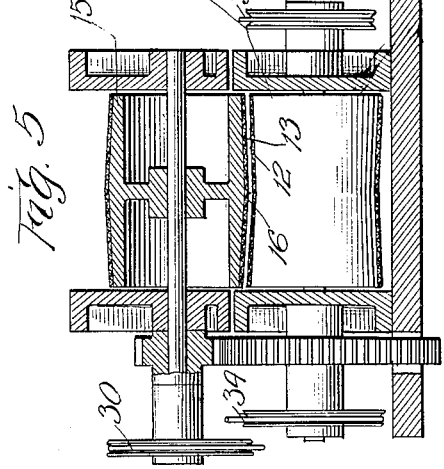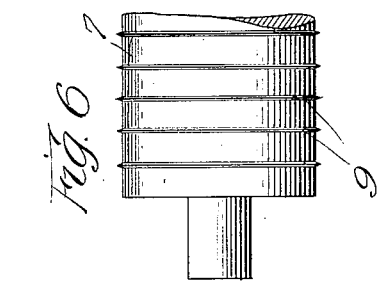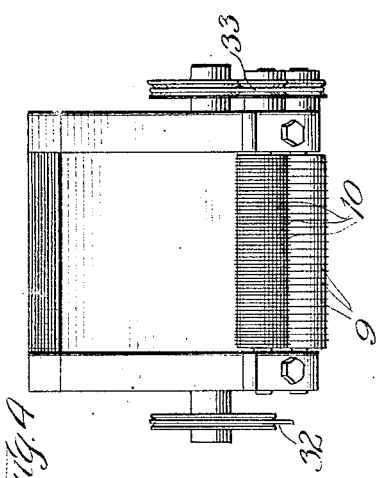

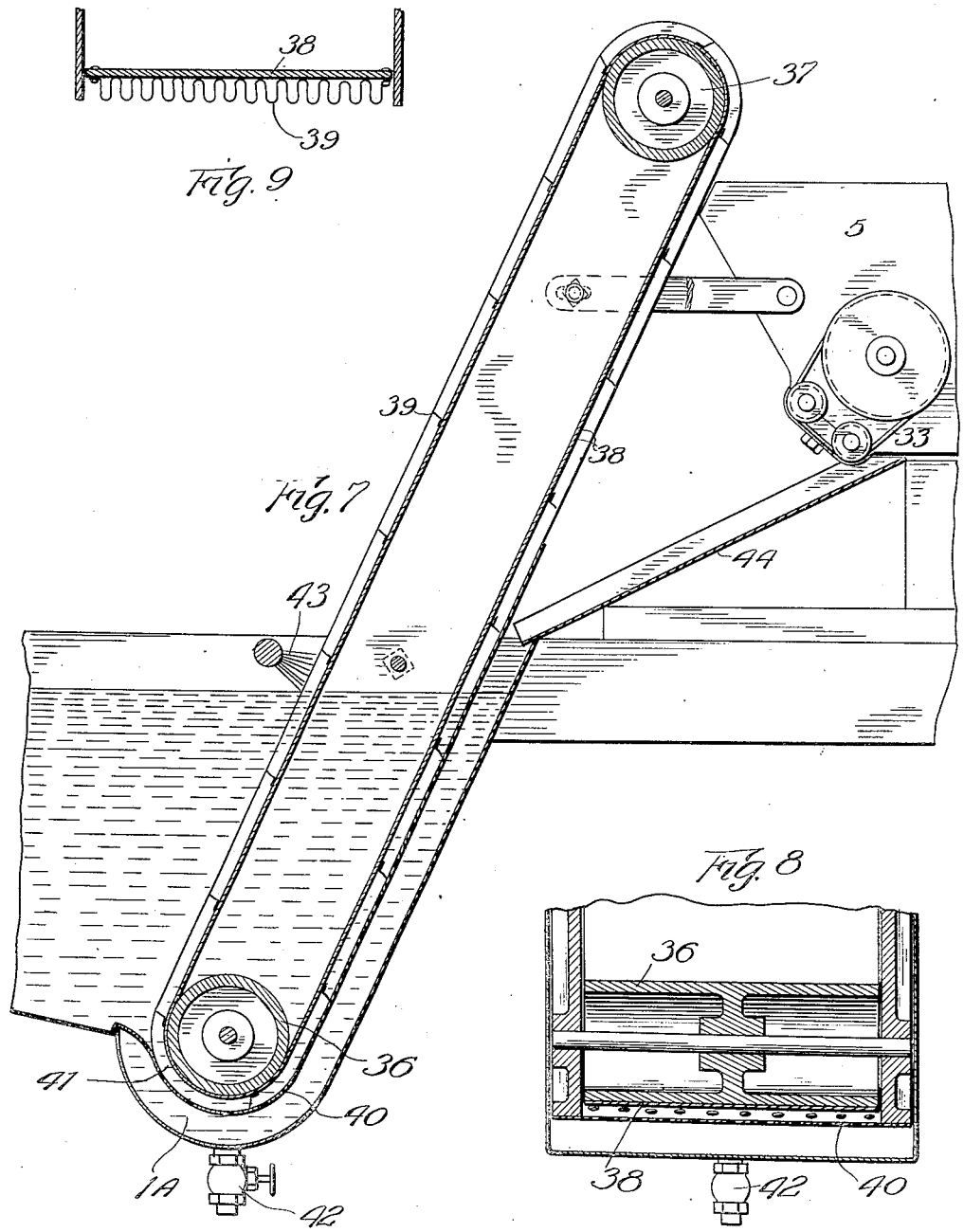

JAMES G. KENNEDY, OF CHICAGO, ILLINOIS, ASSIGNOR OF ONE-HALF TO WILLIAM H. BROWN, OF CHICAGO, ILLINOIS.

NUT-BLANCHER.

1,350,506. Specification of Letters Patent. Patented Aug. 24, 1920.

Application filed April 11, 1919. Serial No. 289,375.

*To all whom it may concern:*

Be it known that I, JAMES G. KENNEDY, a citizen of the United States of America, and a resident of Chicago, county of Cook, and State of Illinois, have invented certain new and useful Improvements in Nut-Blanchers, of which the following is a specification.

The main objects of this invention are to provide an improved form of machine for blanching nuts without breaking or splitting the kernels; to provide improved means for treating the nuts for the purpose of toughening the hulls; to provide improved means for first loosening the skins or hulls of the nuts; to provide improved means for removing said loosened hulls; to provide improved means for separating the hulls from the blanched kernels; to provide an improved form of elevator for conveying nuts from the treating means to the means for loosening the hulls; and to provide improved means for adjusting the several parts of said machine for the purpose of enabling the machine to be used for blanching nuts of various kinds and sizes.

An illustrative embodiment of this invention is shown in the accompanying drawings, in which—

Figure 1 is a side elevation of a nut-blanching machine constructed in accordance with this invention.

Fig. 2 is a plan of the same.

Fig. 3 is an enlarged sectional detail of the mechanism which loosens the hulls and which removes the hulls from the kernels.

Fig. 4 is an end elevation of that part of the machine which loosens the hulls, the view being taken from the left of Fig. 3.

Fig. 5 is a transverse sectional detail taken on the line 5—5 of Fig. 3.

Fig. 6 is an enlarged fragmentary detail of one of the rotatable members forming a part of the mechanism which loosens the hulls.

Fig. 7 is an enlarged sectional elevation of the elevator which conveys the nuts from the treating bath to the hull-loosening mechanism.

Fig. 8 is a sectional detail of the lower end of the same.

Fig. 9 is a detail of one of the pockets of the elevator.

The specific embodiment herein illustrated comprises a treating tank A, hull-loosening mechanism B, hull-removing mechanism C, and separating mechanism D, all arranged adjacent to each other and operated by a power unit E, so that the nuts with their hulls on are fed into the machine at one end and are delivered at the other in a completely blanched condition.

The treating mechanism A comprises a tank 1 containing a quantity of liquid and having a gas burner 2 arranged adjacent thereto whereby the liquid may be heated if it is desired. The bottom of the tank is inclined toward a pocket 1$^A$ at the lower forward end. A hopper 3 is mounted at the other end of the tank, into which the nuts with their skins on are placed and are fed by gravity along the inclined bottom of said tank, toward the pocket 1$^A$. A conveyer 4 runs into the tank 1 and is adapted to take the nuts therefrom and carry them up and dump them into the hopper 5, the construction of which elevator will be more fully hereinafter explained.

The hull-loosening mechanism B comprises a hopper 5, the side 6 of which is inclined so as to provide a chute along which the nuts are caused to move in passing between the hull-loosening members 7, 8, and 11 to the hull-removing mechanism. The members 7 and 8 are in the form of cylinders journaled outside of the casing and having parts of their peripheries extending into openings formed in the side 6. Sharpened ridges 9 and 10 are formed on or extend outwardly from the peripheries of the members 7 and 8 respectively. On the member 8 there are preferably twice as many of these ridges as on the member 7, so that said ridges on the respective members are arranged in staggered relation, as more clearly seen in Fig. 4. These ridges may be either integrally formed upon the members or they may be separately constructed disks located between other and thicker disks of smaller diameter.

The member 11 is herein shown in the form of a cylindrical brush journaled within the hopper 5 so that its periphery is near and opposed to the peripheries of the members 7 and 8. The members 7 and 8 and the brush 11 are adapted to be rotated at relatively different speeds, so that the nuts in passing between them are caused to have a relative shifting or agitation on the ridges 9, which tend to cut or split the hulls.

The hull-removing mechanism C comprises a pair of conveyers in the form of belts 12 and 13 traveling around pairs of rollers or drums 14 and 15 respectively and arranged adjacent to each other so as to provide a space 16 between the opposed faces. Rollers 17, having concave peripheries (Fig. 5), are mounted below the upper part of the belt 12, and rollers 18, having convex peripheries (Fig. 5), are arranged above the lower part of the conveyer belt 13. The rollers 14 and 15 are arranged in staggered relation as shown in Fig. 3, and shape the opposed parts of the belts so that the nuts more readily tend to move toward the middle line thereof. The conveyer 12 extends at both ends beyond the conveyer 13, so that at one end it provides a ledge upon which the nuts discharged from the hull-loosening mechanism B are received preparatory to passing along the space 16 between said conveyers. The other end of the conveyer 12 overlaps a third conveyer 19 to which the kernels and hulls are delivered and adjacent to which the hull-separating mechanism is located.

One of the rollers 14 and one of the rollers 15 are connected together by a gear 20 and pinion 21 (see Figs. 1 and 2) by means of which said conveyers 12 and 13 are positively driven in the same direction at relatively different speeds. The rubbing action upon the nuts, of these conveyers traveling at relatively different speeds, tends to readily remove the hulls from the nuts with little or no danger of breaking or splitting the kernels.

The support 22 which carries the rollers for the conveyer 13 is supported on the frame 23 by means of links 24 in such a manner that the conveyer 13 may be moved toward or away from the conveyer 12 for the purpose of increasing or decreasing the space 16 and to enable the machine to be used for nuts of various kinds and sizes.

The hull-separating mechanism D comprises the conveyer 19 extending beyond the hull-removing mechanism C and having a pair of air suction pipes 25 with nozzles 26 spaced apart along the conveyer 19 and sufficiently close thereto so that the skins are sucked up through the pipes 25 and by means of a blower (not shown), and discharged into a suitable receptacle.

The conveyer 4 comprises a pair of rollers 36 and 37, one of which is arranged within the pocket 1^A of the tank 1 and the other above and adjacent to the hopper 5. A conveyer belt 38 extends around these pulleys and has a plurality of transversely disposed members 39 formed thereon which are adapted to carry the nuts from the liquid in the tank 1 to the hopper 5. The members 39 are preferably formed of a piece of wire bent as shown in Fig. 9, so as to provide forwardly extending projections or fingers, which in conjunction with the belt constitute pockets in which the nuts are carried from the tank 1 to the hopper 5. Such a construction insures a proper draining of the nuts as they are removed from the liquid.

A foraminous partition 40 is located in the pocket 1^A concentrically of the pulley 36, so that as the nuts travel down along the inclined bottom of the tank 1 they normally enter the space 41 between the conveyer belt 38 and the partition 40, where they are more readily gathered up by the members 39.

A valve 42 is located at the bottom of the pocket 1^A, by means of which the tank may be drained.

A brush 43 is located adjacent to the conveyer belt 38 just above the water line, so that as the members 39, with a quantity of nuts thereon, emerge from the water, any excess quantity of the nuts is brushed off back into the tank. The drain-board 44 is arranged below the hull-loosening mechanism so that any liquid draining from the nuts in the hopper 5 runs back into the tank 1.

The power unit E comprises a motor 27 connected by a belt 28 to a large pulley 29 from which belts 30 and 31 lead respectively to the conveyer 13 and the conveyer 19. A belt 32 leads from a pulley on one of the rollers 15 to a pulley connected to the brush 11, and a belt 33 leads from another pulley on the brush 11 to suitable pulleys on the members 7 and 8. Another belt 34 leads from the pulley connected to one of the rollers 14 to a suitable pulley 35 by means of which the conveyer 4 is operated.

The operation of the device herein shown is substantially as follows: A quantity of nuts are placed in the hopper 3, and through gravity gradually move downwardly along the inclined bottom of the tank 1 into the space 41 of the pocket 1^A. As they move through the liquid in said tank, the skins or hulls are toughened by absorbing the moisture. With some kinds of nuts it is necessary to use warm liquid, and in such case, the burner 2 may be put in service.

From the tank 1 the nuts are conveyed by the conveyer 4 to the hopper 5 and are caused to travel along the inclined side 6 between the brush 11 and the members 7 and 8, where the skins or hulls are cut or loosened as hereinbefore described. The nuts are then discharged onto the conveyer 12 and pass along between the conveyer belts 12 and 13, where, due to the differential action of said conveyers, a rubbing action on the nuts is produced and the hulls are removed from the kernels. The kernels and the hulls are then discharged by the conveyer 12 onto the conveyer 19, along which they move, and during their travel the hulls are sucked up through the nozzles 26 and the blanched kernels are discharged at the end of the conveyer 19 into a suitable receptacle.

Although but one specific embodiment of this invention has been herein shown and described, it will be understood that numerous details of the construction shown may be altered or omitted without departing from the spirit of this invention as defined by the following claims.

I claim:

1. In a nut-blanching machine, the combination of a pair of conveyer belts arranged in substantially parallel relation with a space between said belts, mechanism for positively driving said belts at relatively different speeds in the same direction, means for feeding nuts to the space between said belts whereby the hulls are removed by the differential action of said belts, conveying means extending beyond one of said belts, and air suction means comprising a pair of vertically disposed pipes arranged above said extended conveying means and spaced apart therealong with the suction ends near the upper surface thereof, whereby an air current is adapted to remove the hulls from the kernels.

2. In a nut-blanching machine, the combination of a cylindrical member having a plurality of sharp peripheral ridges formed thereon, a cylindrical brush rotatably mounted adjacent to said member and adapted to have nuts passed between said member and said brush for the purpose of having the hulls loosened, and means for rotating said member and brush at relatively different speeds.

3. In a nut-blanching machine, the combination of a pair of cylindrical members rotatably mounted adjacent to each other, sharp peripheral ridges formed on each of said members, the ridges on one member being arranged in staggered relation to those on the other member, a brush rotatably mounted adjacent to said members and adapted to have nuts passed between said brush and members for the purpose of having the hulls loosened, and means for rotating said members and brush at relatively different speeds.

4. In a nut-blanching machine, the combination of a casing having one side thereof inclined to form a chute for the passage of nuts therealong, a cylindrical member rotatably mounted adjacent to said casing and having a part of its periphery extending through an opening in said one side, a brush rotatably mounted within said casing adjacent to said member and adapted to coact with said member for acting upon the nuts as they pass along said casing side, and means for rotating member and brush.

5. In a nut-blanching machine, the combination of a casing having one side thereof inclined to form a chute for the travel of nuts therealong, a pair of cylindrical members rotatably mounted adjacent to said casing side and having parts of the peripheries extended through openings in said casing side, a brush rotatably mounted within said casing and adapted to coact with said members for acting upon said nuts as they pass along said casing side, and means for rotating said members and brush at relatively different speeds.

6. In a nut blanching machine, the combination of a pair of relatively rotatable members adapted to have nuts pass between them, means on said members adapted to loosen the hulls on said nuts, mechanism for rotating said members, a second pair of relatively movable members adapted to have the nuts pass between them, means for conveying the nuts to and from each pair of members in turn, and mechanism adapted to cause the relative movement of said second pair of members so as to cause them to remove the hulls from said nuts.

7. In a nut-blanching machine, the combination of a hopper having a chute leading therefrom, a pair of rotatable members arranged adjacent to said chute and adapted to have the nuts pass between them, said members having differently formed irregular surfaces whereby the nuts passing between said members have their hulls loosened, mechanism for rotating said members, a pair of conveyer belts arranged in substantially parallel relation and arranged to receive nuts from said chute to be passed between said belts, and mechanism for moving said belts at relatively different speeds for causing said belts to remove the hulls from said nuts.

8. In a nut-blanching machine, the combination of a tank having the bottom thereof inclined and terminating at one end in a pocket, said tank being adapted to contain a quantity of liquid for treating nuts, mechanism for removing the hulls from the nuts, a pair of pulleys located one in the pocket of said tank and the other adjacent to said mechanism, a belt extending around said pulleys, a plurality of transversely disposed ledges on said belt adapted to form pockets for carrying nuts from the liquid in said tank to said mechanism, and a foraminous partition arranged in said pocket concentrically of said roller adapted to coact with said members for delivering nuts to said pockets.

Signed at Chicago this 3rd day of April, 1919.

JAMES G. KENNEDY.